Aug. 10, 1965  C. D. FISHER  3,199,146
CLAMPING MEANS FOR PELLET MILL DIE
Filed April 16, 1962  2 Sheets-Sheet 1
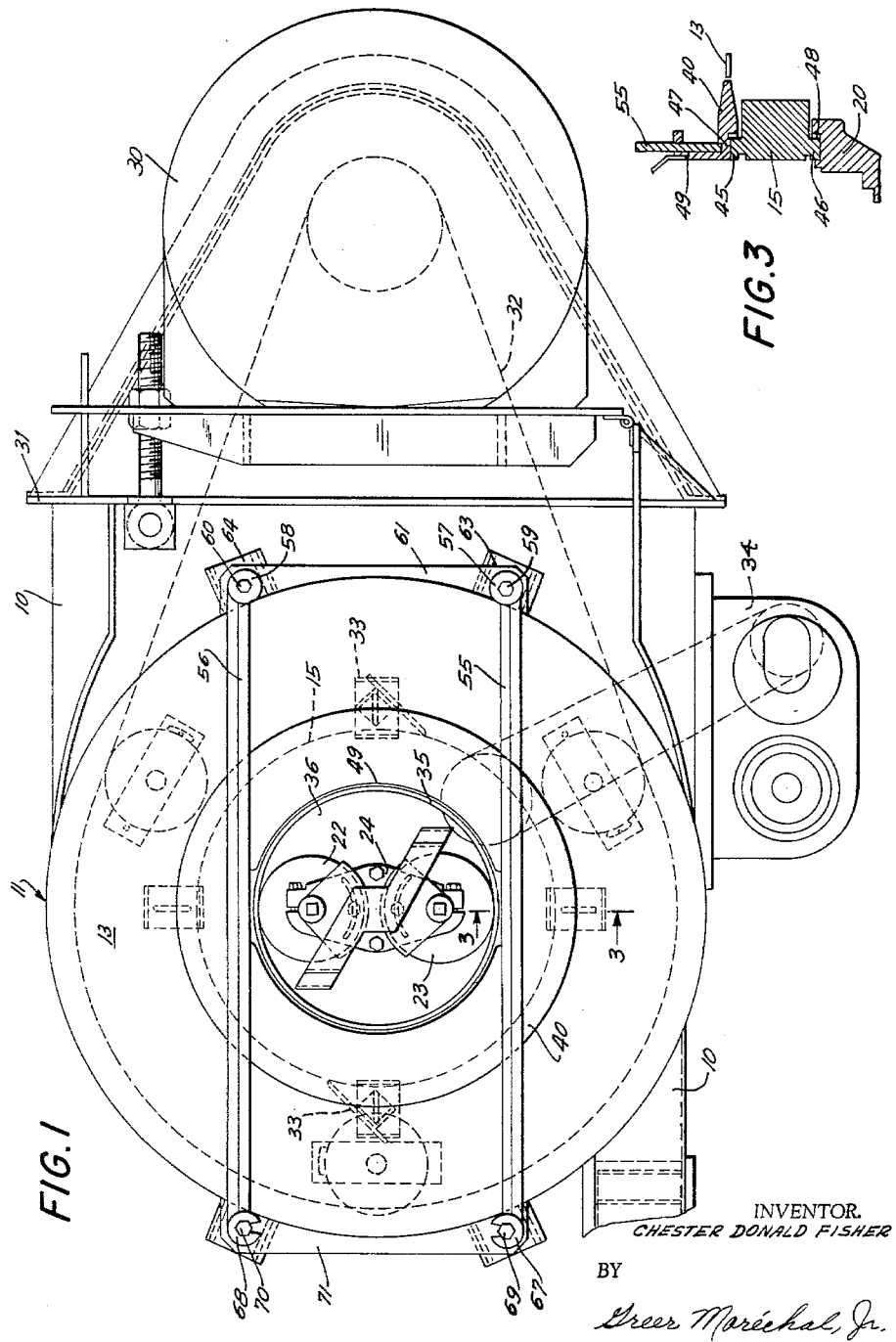
INVENTOR.
CHESTER DONALD FISHER
BY
Greer Maréchal, Jr.
ATTORNEY

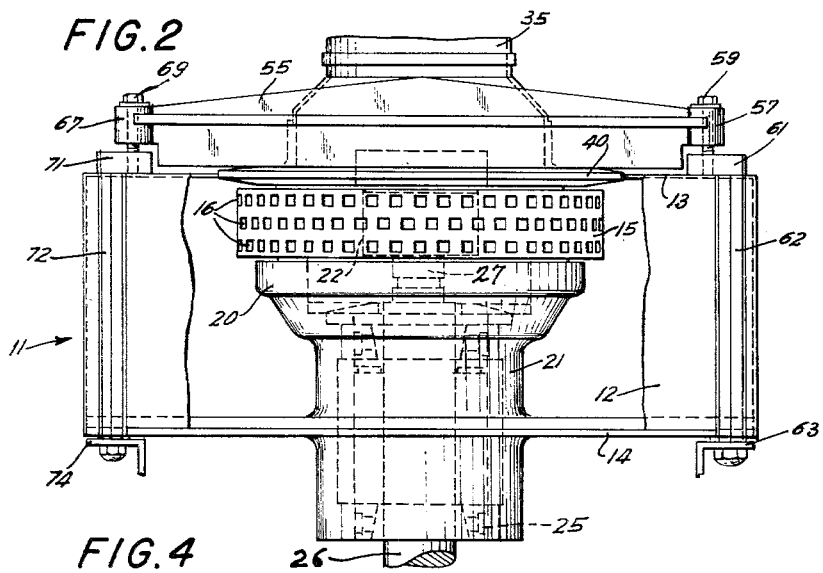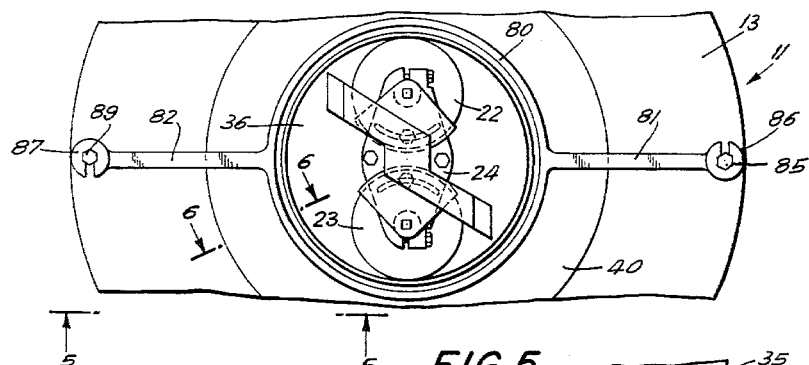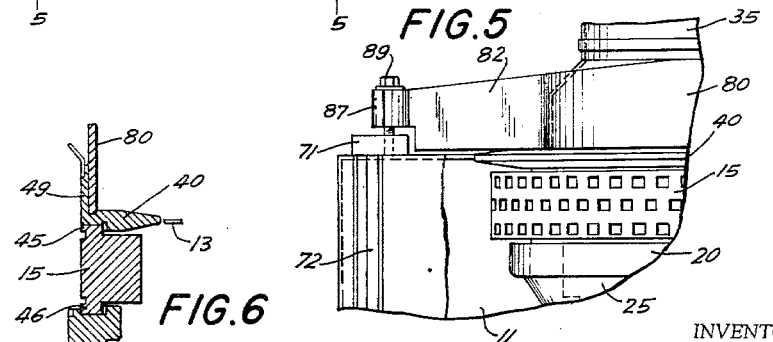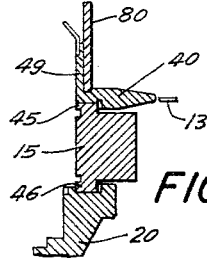
INVENTOR.
CHESTER DONALD FISHER
BY
Greer Maréchal, Jr.
ATTORNEY

United States Patent Office 3,199,146
Patented Aug. 10, 1965

3,199,146
CLAMPING MEANS FOR PELLET MILL DIE
Chester Donald Fisher, Muncy, Pa., assignor to Sprout, Waldron & Company, Inc., Muncy, Pa., a corporation of Pennsylvania
Filed Apr. 16, 1962, Ser. No. 187,761
5 Claims. (Cl. 18—12)

This invention relates to extrusion-type pellet mills and like apparatus for forming pellets of a mass or mash of material by extrusion through extrusion openings in an annular or toroidal die and, more particularly, to a quick-change and simplified clamping arrangement for holding the pelleting die in position in the apparatus and facilitating and simplifying both the manufacture of the pelleting die and the task of changing one die for another in the use of the apparatus.

Pellet mills or pelleting apparatus of the character to which this invention relates are well known, and may be generally considered as utilizing a heavy metal annular or toroidal die with radial extrusion openings or passages in the peripheral or circumferential surface thereof. Material to be pelleted is introduced into the central portion of the die and is forced outwardly through the extrusion openings to form self-sustaining pellets by one or more pressure rollers moving against the interior annular wall of the die during relative rotating movement between the die and the rollers. Such apparatus has been arranged on either a vertical or horizontal axis and either with the die stationary and the internal pressure rolls rotating or, vice versa, with the internal rolls being stationary and the annular die rotating around them.

As representative of such vertical axis pelleting apparatus with a stationary die and rotating pressure rollers may be noted the type of pellet mill disclosed in Patent No. 2,178,009, while the apparatus disclosed in Patent No. 2,764,951 is illustrative of a type of horizontal axis pellet mill with stationary pressure rollers and a rotating die. Regardless of which specific arrangement is being considered, the heavy annular or toroidal die must be fastened by the annular edges thereof to some sort of die support means and firmly supported thereon against both rotative forces or stresses and the rather high extrusion pressures imposed thereon during the pelleting operation. Furthermore, whatever means are utilized for affixing the die to the die support are preferably arranged to be as readily releasable as possible in view of the necessity for frequently changing the die in the apparatus—either because of becoming worn or, more frequently, because of needing different dies with different sizes or shapes of extrusion openings for producing different kinds or sizes of pellets from the same pelleting apparatus.

Although a vertical axis pellet mill with a stationary die (generally of the type disclosed in above mentioned Patent No. 2,178,009) is here utilized for purposes of illustrating and explaining this invention, it is to be understood that the advantages and constructions in accordance herewith are useful and adapted to horizontal axis pellet mills as well as those in which the die itself is rotating instead of stationary. Such various types of pelleting apparatus share certain common considerations or requirements, as will be understood, with respect to the mounting or affixing of the pelleting die therein on an appropriate support or carrier therefor, which considerations or requirements are to be recognized as presenting certain definite engineering problems in view of both the heavy weight of the die itself and the extremely high rotative and pressure forces to which it is subjected in use.

If it is attempted to provide for affixing the die to the die support by utilizing a plurality of bolts or cap screws threaded into holes in the die, difficulties may be experienced in the manufacturing operations in maintaining absolute registry of the threaded holes in each of a plurality of dies with the particular die support in the apparatus, as well as additional problems of finishing and fitting the die in situations where the die may be heat treated after the holes are tapped. Similarly, with such an arrangement, substantial time may be consumed in changing from one die to another at the point of use in the apparatus and/or in loosening or tightening the bolts involved.

If it is attempted, on the other hand, to arrange for fixing the die onto the die support as by various types of U-clamps, tension rings, etc., bearing upon or engaging beveled or other flanges around the die, additional problems of manufacturing and fitting may be encountered, and particularly when the outer circumferential or annular face of the die must be free of clamping arrangements in order to permit extrusion of the pellet material. As will be understood, replacement or additional sizes of dies are frequently if not usually manufactured remote from the point of the location of the pelleting apparatus and without the benefit of fitting the die directly to the apparatus in a machine shop. Furthermore, the provision of beveled or other flange surfaces requiring close tolerance machining or other finishing treatment in order to present an appropriately sized and configured clamping surface for achieving the desired firm clamping arrangement or support interjects into the manufacturing operation additional undesired cost, particularly when the user of such pelleting apparatus may desire or need quite a large number of different dies for purposes either of replacement of worn dies or producing a large variety of shapes and sizes of pellets, each of which requires a different die on the same machine.

According to this invention, by contrast, there is provided a structure and arrangement whereby the annular pelleting die is readily and simply clamped onto the die support in pelleting apparatus of the character described without the use of holding bolts and without the provision on the die of flanges or beveled fitting surfaces or tension ring clamping seats, or the like, thus substantially simplifying the manufacturing operations necessary for finishing the die and increasing the speed and ease with which dies can be changed or replaced in the pelleting apparatus; and such an arrangement in accordance herewith is illustrated by clamping means on or in the apparatus frame or die support itself with opposed engaging means for securing the die support and in a manner to require on the die itself no more than easily finished planar seating surfaces.

With the foregoing and other objects in view, this invention will now be more particularly described and other objects and advantages thereof will be apparent from the following description thereof, the accompanying drawings, and the appended claims.

In the drawings:

FIG. 1 is a top elevation of pelleting apparatus having an arrangement embodying and for practicing this invention applied thereto;

FIG. 2 is a partial side view partly broken away of that portion of the apparatus of FIG. 1 having the invention applied thereto and as viewed from the bottom of FIG. 1;

FIG. 3 is a partial detailed section taken on the line 3—3 of FIG. 1;

FIG. 4 is a partial top elevation of apparatus similar to FIG. 1 and showing a different modification embodying and for practicing this invention;

FIG. 5 is a partial vertical section along the line 5—5 of FIG. 4; and

FIG. 6 is a partial vertical section similar to FIG. 3, but taken along the line 6—6 of FIG. 4.

In the drawings, in which like characters of reference refer to like parts throughout the several views thereof, an arrangement embodying and for practicing this invention is illustrated as being applied to pelleting apparatus generally of the nature disclosed in the above mentioned Patent No. 2,178,009. Thus, the apparatus is illustrated as having a main base or frame structure indicated generally at 10 above which is supported a generally cylindrical housing 11 having vertical side walls 12 and top and bottom closure plates 13 and 14 respectively. Within housing 11 is positioned annular or toroidal die 15 having a plurality of radial extrusion passages 16 in the circumferential walls thereof. Die 15 is supported on a die support 20, which is in turn supported on a central column 21 from base 10. Within toroidal die 15 are two pressure rollers 22 and 23, supported in known manner on a yoke or spider 24, 27 which is in turn supported for rotation axially within bearing means 25 on shaft 26, whereby rotation of shaft 26 causes rotation of the entire yoke or spider 24, 27 and roller assembly 22–23 in a manner such that the outer peripheral surfaces of rollers 22 and 23 bear against or cooperate with the internal surfaces of die 15 for forcing material radially outwardly from inside die 15 through extrusion passages 16 therein, all in known manner.

A main drive motor 30 is indicated, also carried as by bracket 31 on main base or frame 10, and including conventional drive means 32, such as V-belts or the like, for rotating shaft 26, as well as additional drive means indicated generally at 34 for rotating a plurality of cutting knives 33 around the outside of die 15 for cutting the material being extruded into pellets of the desired length, also in known manner.

The material to be pelleted is introduced, in either dry or mash form, through material inlet 35 and a central opening 36 to fall inside of die 15 where it will be contacted by rotating pressure rollers 22 and 23. As will be apparent from the foregoing, material to be pelleted is introduced into die 15 in housing 11 and subjected to the pressure and pelleting action therein of rotating pressure rollers 22 and 23 forcing the material outwardly through extrusion passages 16 in die 15 as yoke 24–27 rotates with main shaft 26 in bearings 25. As the material is extruded from the outer circumferential surface of die 15, rotating knives 33 cut the extruded material into the desired lengths of pellets, which fall down within housing 11 to be recovered and collected and discharged in conventional manner.

Circular die coverplate 40, is provided for engaging the upper surface of die 15 and for interfitting engagement with top plate 13 of housing 11, and plate 40 also includes central opening 36 and has provisions for receiving and accommodating material inlet 35, as well as forming a portion of the die-clamping arrangement in accordance herewith. Also, die cover 40 has an upstanding ring or flange 49 defining central opening 36 and for engaging material inlet 35.

As indicated more particularly in FIG. 3, the opposite annular faces of die 15 include seating flanges 45 and 46 for supporting the die by engagement with annular channels or grooves 47 and 48, respectively, in die cover 40 and die support 20, clamping forces, to be described hereafter, are applied to move die cover 40 toward die support 20 and clamps die 15 therebetween in the desired position and as defined by grooves 47 and 48, with sufficient force to resist angular moments to which die 15 may be subjected as rollers 22 and 23 rotate against the inside surface thereof.

In order to provide the desired clamping force in accordance herewith, two clamping bars 55 and 56 are provided as indicated in FIGS. 1–3 passing across the top surface of die cover 40 on either side of ring 49 thereof. One end of each of the bars 55 and 56 is pivoted at, respectively, 57 and 58 as by bolts 59 and 60 threadedly engaged as with plate 61 and tie bars 62, the lower ends of which are engaged at 63 and 64 with flanges or brackets mounted on main frame 10. The opposite ends 67 and 68 engage bolts 69 and 70, preferably with quick-release slots as indicated in FIG. 1, which bolts are threadedly engaged, as through a plate 71, with similar tie rods 72, the bottom ends of which are similarly carried by brackets 74 on main frame 10.

As will be apparent from the foregoing, loosening bolts 69 and 70 permits swinging clamp bars 55 and 56 outwardly, as hinged by the ends 57 and 58 thereof, and out of engagement with die cover 40, which can be simply lifted out of the way and die 15 completely removed by merely lifting off die support 20. A new die 15 is set on die support 20, die cover 40 repositioned, and bars 55 and 56 swung back into position indicated in FIG. 1. Thereupon the bolts 69 and 70 need only be tightened again to clamp the new die in position, the clamping forces being carried primarily by tie rods 62 to the extent desired to impose clamping pressure on die 15 between die cover 40 and die support 20.

Thus, in a matter of only a few minutes, die 15 can be completely removed and replaced and the apparatus again ready for operation—as compared with perhaps 20 minutes or a half hour as may be required to remove and replace a die with more conventional arrangements. Quite apart from the ease and simplicity permitted in accordance with this invention, it is not infrequent that the users of pellet mills may desire to change dies a number of times a day and/or after only short runs of 20 or 30 minutes in the manufacture of different kinds of pellets under which circumstances the speed permissible in changing dies here becomes a quite significant commercial consideration.

Referring to FIGS. 4–6, a further embodiment or modification of an arrangement embodying and for practicing this invention is illustrated as applied to a similar pellet mill apparatus also including a die support 20, a pelleting die 15, a die cover 40, housing 11, material inlet 35, etc., substantially as shown in FIGS. 1–3. In this embodiment, however, a clamping ring 80 is provided for fitting around ring 49 and providing clamping pressure against the top of die cover 40, with oppositely extending clamping arms 81 and 82 extending radially so that the opposite ends 85 and 87 thereof engage bolts 86 and 89, as indicated in FIGS. 4 and 5, for quick release removal of the clamping engagement 80–82, as previously described with regard to FIGS. 1–3.

As will be apparent from the foregoing, arrangements of clamping mechanism in accordance herewith provide for affixing such a pelleting die to the die support of pellet mills of the character described without the use of bolts tapped into the die and without the use of especially machined or beveled or extending fitting flanges and the complicated or close tolerance U-clamps association therewith. Actually when it is realized that pelleting dies of the character here described may be heavy steel dies of at least 24" in diameter and 5" high with the circumferential extrusion walls perhaps 4" thick, it is apparent that considerable clamping force is necessary to hold such dies in position, particularly against the high extruding pressures to which they are subjected in use. Bolt holes in such dies, it has been found inevitably provide a weakening focal point for fatigue on the highly stressed die, as well as complicating and lengthening the task of changing dies and of making replacement dies which, in their final and heat treated condition, will have the bolt holes in register with those of the die support.

Furthermore, since the die is one portion of the pellet mill which must be changed frequently—either because it is constantly subject to heavy attrition wear by abrasion of the material being pelleted or because of the desire to make different size and different shaped pellets— any manufacturing operation which renders more expensive the manufacture of the die is not to be desired. As will be understood, tapped bolt holes, extending peripheral flanges, particularly beveled or finely machined flanges or seating surfaces, and the like, are more expensive to manufacture, and the prevalent if not universal use of such expedients to hold the die in position may be attributed more to the lack of better arrangements than to the desirability thereof.

By contrast, an arrangement in accordance with this invention provides for rapid die changing, simplicity of manufacture of both the dies and the clamping mechanism (which, as noted, do not even require specifically fitting the die into the tension-producing means of the clamping mechanism as in the case with a tension ring or U-clamp), all to produce the enhanced advantages hereof. Such advantages are obtained whether either of the specific structures described above is used as illustrated or whether other modifications thereof including other versions of arrangements for producing a clamping force on the edge of the die as through die cover 40 with clamping mechanism mounted on the pellet mill frame or die support and independent of the die and capable of clamping or accommodating a variety of different dies without being specifically machined and fitted to each. As will also be apparent, these advantages and benefits obtained in accordance herewith with arrangements which are simple and economical to manufacture and which can be fairly simply applied to existing pellet mills without a complete reorganization of redesigning of the structures thereof and, in most cases, without necessitating changes in the mill which will not also accommodate dies held in position according to prior art or conventional systems, if desired.

While the structures and apparatus herein described constitute preferred embodiments of the invention, it is to be understood that the invention is not limited to these precise structures and apparatus, and that changes may be made therein without departing from the scope of the invention which is defined in the appended claims.

What is claimed is:

1. In a pellet mill of the character described having a pelleting die through which material to be pelleted is extruded and pressure means for extruding said material through said die upon relative rotary movement of said pressure means and said die and cut-off means around the outside of said die for cutting said material extruded therethrough into said pellets, the combination which comprises stationary support means for mounting said die for cooperation with said pressure means and engaging and supporting one edge of said die, a cover ring for engaging the opposite edge of said die, and releasable clamping means extending between said support means and said cover ring for urging said cover ring toward said support means effecting clamping engagement and compression of said die therebetween, said releasable clamping means being spaced outwardly from said die and said edges thereof permitting free relative rotary movement of said die and said cut-off means therearound.

2. In a pellet mill of the character described having an annular pelleting die through which material to be pelleted is outwardly extruded and pressure means for extruding said material through said die upon relative rotary movement of said pressure means and said die and cut-off means around the outside of said die for cutting said material extruded therethrough into said pellets, the combination which comprises stationary support means for mounting said annular die around said pressure means and for engaging and supporting one annular edge of said die, a cover ring for engaging the opposite annular edge of said die, and releasable clamping means extending between said support means and said cover ring for urging said cover ring toward said support means effecting clamping engagement and compression of said annular die throughout the full extent thereof, said clamping means being outwardly spaced from the surface of said die between said annular edges thereof for unrestricted relative rotary movement between said cut-off means and said die.

3. In a pellet mill of the character described having an annular pelleting die through which material to be pelleted is outwardly extruded and pressure means for extruding said material through said die upon relative rotary movement of said pressure means and said die, the combination which comprises stationary housing and support means for mounting said annular die around said pressure means and for engaging and supporting one annular edge of said die, a cover ring for at least partially covering said die at the side thereof opposite the said support means, said cover ring including an annular groove for engaging the opposite annular edge of said die, and releasable clamping means extending between said support means and said cover ring for urging said cover ring toward said support means effecting clamping engagement and compression of said annular die therebetween, said clamping means including a plurality of tie rods outwardly spaced around said die and extending from said support means generally parallel to the axis of said die and releasable clamping bar means extending between oppositely positioned said tie rods and across the outside of said cover ring.

4. In a pellet mill of the character described having an annular pelleting die through which material to be pelleted is outwardly extruded and pressure means for extruding said material through said die upon relative rotary movement of said pressure means and said die, the combination which comprises stationary housing and support means for mounting said annular die around said pressure means and including an annular groove for engaging and supporting one annular edge of said die, a cover ring supported on said housing and support means for at least partially covering said die at the side thereof opposite the said support means, said cover ring including an annular groove for engaging the opposite annular edge of said die, and releasable clamping means outside said cover ring and extending from said housing and support means to and over said cover ring for urging said cover ring toward said support means effecting clamping engagement and compression of said annular die therebetween, said clamping means including at least one releasable clamping bar extending over and against said cover ring and for a substantial distance beyond the periphery thereof, and tension means connecting opposite ends of said bar with said main support for effecting said clamping engagement.

5. In a pellet mill of the character described having an annular pelleting die through which material to be pelleted is outwardly extruded and pressure means for extruding said material through said die upon rotary movement of said pressure means against said die inducing forces tending to cause said die to rotate, the combination which comprises stationary support means below said die for mounting said die around said pressure means and including an annular groove for engaging and supporting the lower annular edge of said die, a cover ring over the top of said die and including an annular groove for engaging the upper annular edge of said die, and releasable clamping means outside said cover ring extending between said support means and said cover ring for urging said cover ring toward said support means effecting clamping engagement and compression of said die therebetween against said rotating forces, said clamping means including a plurality of vertical tie rods extending from said support means to above said cover means and spaced a substantial distance radially outwardly from both said die and said cover ring, and releasable clamping bar means extending between opposite ones of said tie rods and across the top of said cover ring for effecting said clamping engagement and compression.

References Cited by the Examiner

UNITED STATES PATENTS

| | | | |
|---|---|---|---|
| 2,240,660 | 5/41 | Meakin | 18—12 X |
| 2,241,546 | 5/41 | Evenstad et al. | 18—12 |
| 2,295,743 | 9/42 | Meakin | 18—12 |
| 2,994,918 | 8/61 | Landers | 18—12 |

WILLIAM J. STEPHENSON, *Primary Examiner.*

MICHAEL V. BRINDISI, *Examiner.*